US005484347A

United States Patent [19]

Holmquist

[11] Patent Number: 5,484,347
[45] Date of Patent: Jan. 16, 1996

[54] VARIABLE RATE LOCKING DIFFERENTIAL WITH PYROLITIC-CARBON FRICTION CLUTCH

[75] Inventor: Ralph E. Holmquist, Battle Creek, Mich.

[73] Assignee: Eaton Corporation, Cleveland, Ohio

[21] Appl. No.: 127,391

[22] Filed: Sep. 27, 1993

Related U.S. Application Data

[63] Continuation-in-part of Ser. No. 29,083, Mar. 10, 1993, abandoned.

[51] Int. Cl.$^6$ .............................. F16H 1/44; F16D 11/00; F16D 13/60
[52] U.S. Cl. ........................................ 475/231; 192/107 M
[58] Field of Search ............................... 475/230, 231, 475/234, 236; 192/107 M; 428/244

[56] References Cited

U.S. PATENT DOCUMENTS

| | | |
|---|---|---|
| 3,831,462 | 8/1974 | Baremor ................................ 475/231 |
| 3,932,568 | 1/1976 | Watts et al. ..................... 192/107 M X |
| 4,238,013 | 12/1980 | Goscenski, Jr. ........................... 475/231 |
| 4,389,909 | 6/1983 | Goscenski, Jr. ........................... 475/231 |
| 4,700,823 | 10/1987 | Winckler ............................. 192/107 M |
| 5,007,886 | 4/1991 | Holmquist et al. ..................... 475/231 |
| 5,083,650 | 1/1992 | Seiz et al. ........................... 192/107 M |
| 5,103,942 | 4/1992 | Schmitt .......................... 192/107 M X |
| 5,230,952 | 7/1993 | McCord ........................... 192/107 M X |

*Primary Examiner*—Khoi Q. Ta
*Attorney, Agent, or Firm*—L. J. Kasper

[57] ABSTRACT

A locking differential is disclosed having a clutch pack (35) operable to retard rotation between a gear case (11) and a pair of sidegears (23,25). A cam (41) is operatively associated with the clutch and includes an axially movable cam member (43) to engage the clutch pack. The clutch pack includes active clutch discs (63,73) operable to effect the rate of engagement of the clutch pack. At least one pair of active disc surfaces having pyrolytic carbon friction material (75) and the other surface having a non-pyrolytic carbon friction material. With repeated use and increasing temperature, the rate of engagement of the clutch pack increases, providing a "variable rate" locking differential.

10 Claims, 4 Drawing Sheets

VARIABLE RATE LOCKING DIFFERENTIAL WITH PYROLITIC-CARBON FRICTION CLUTCH

CROSS-REFERENCE TO RELATED APPLICATION

This application is a continuation-in-part of U.S. application Ser. No. 29,083, filed Mar. 10, 1993, now abandoned.

BACKGROUND OF THE DISCLOSURE

The present invention relates to differential gear mechanisms, and more particularly, to such mechanisms of the type commonly referred to as "locking differentials".

Differential gear mechanisms of the general type to which the present invention relates are broadly referred to as "limited slip differentials", and typically include a clutch pack which is operable to limit or retard differentiating action between the output gears (sidegears). More specifically, however, the present invention is intended for use on limited slips of the type referred to as "locking differentials", and will be described in connection therewith. In a locking differential, means are provided for engaging or locking the clutch set, rather than permitting it to slip (i.e., the slip is "limited" to the point of being nonexistent), thus substantially eliminating differentiating action between the output gears.

Locking differentials are produced and sold commercially by the assignee of the present invention, with the construction and operation of such locking differentials being illustrated and described in great detail in U.S. Pat. No. 4,389,909, assigned to the assignee of the present invention and incorporated herein by reference. In the device of the above-incorporated patent, there is a flyweight mechanism which rotates about its axis of rotation at a speed representative of the differential speed between the two output gears. Above a predetermined rotational speed (speed of differentiation), the flyweight mechanism is actuated to cause ramping of a cam member relative to another cam member. This ramping action of the cam members results in axial movement of the one cam member, which initiates engagement of an adjacent clutch pack. Typically, the clutch pack is of the "self-actuating" type, i.e., a small amount of frictional engagement within the clutch pack further retards rotation of the adjacent cam member, resulting in further ramping action, which, in turn, causes further axial movement of the cam member and further engagement of the clutch pack.

In the device of the above-incorporated patent, the clutch pack immediately adjacent the cam arrangement includes two types of clutch discs:

1. "Active" discs are those discs disposed immediately adjacent, and operably associated with, the axially movable cam member and which determine the rate of engagement of the overall clutch pack.

2. "Inactive" discs are those discs which are not operably associated with the cam member, but provide at least a major portion of the torque capacity of the clutch pack.

One of the key performance criteria of a locking differential is the "time of engagement" of the mechanism, which is the period of time ($\Delta T$) required for the clutch pack to go from a predetermined, lower torque transmitting capacity to a predetermined, higher torque transmitting capacity. By way of example only, in connection with the development of the present invention, the time of engagement was based upon the $\Delta T$ from 100 foot-pounds of torque capacity to 1000 foot-pounds of torque capacity. As is well known to those skilled in the art, one of the factors in determining the time of engagement is the cam angle (i.e., the angle defined between the cam surface and the transverse plane). In general, for a steeper cam angle, more force must be exerted to move the cam member axially, but it is relatively easier to unlock the cam (which occurs as a result of a torque reversal, or going from a right turn to a left turn, and vice-versa). On the other hand, for a shallower angle, relatively more force is transmitted by the cam member to the clutch, providing a tighter engagement of the clutch, and it is relatively harder to unlock the cam members.

In prior art locking differentials, the clutch packs have typically comprised a plurality of stamped steel clutch discs, with the discs typically including some sort of pattern stamped into the disc face to enhance frictional engagement between adjacent disc surfaces. Although the prior art locking differentials described above, utilizing conventional steel discs, have been generally satisfactory in operation, one particular operating situation has resulted in a performance problem. If a vehicle including a locking differential is in mud or snow, and is "stuck", the vehicle operator will typically try to "rock" the vehicle by putting the transmission, alternately, in forward and then reverse. Each time this is done, if the traction is different at the two drive wheels, a spin-out condition will occur, resulting in an engagement of the locking differential. Whenever a high number of engagements occurs within a fairly short time, the temperature of the device, and especially of the torque-transmitting portion of the differential (i.e, the clutch packs) increases substantially.

As is well known to those skilled in the art, with steel clutch discs, increasing temperature results in a decreased time of engagement (i.e., a longer $\Delta T$ before engagement occurs). This decreasing time of engagement occurs because the coefficient of friction of the steel discs decreases with increasing temperature. The decreasing coefficient of friction results in a decreased overall torque capacity of the differential. In other words, with increased usage within a short period of time, the performance of the locking differential may degrade.

SUMMARY OF THE INVENTION

Accordingly, it is an object of the present invention to provide a differential gear mechanism in which increasing temperature does not result in a decreased time of engagement and a decreased torque capacity.

It is a more specific object of the present invention to provide a differential gear mechanism which accomplishes the above-stated object without requiring additional space for the clutch pack, while at the same time, having at least as much overall torque transmitting capacity, in any given locking differential design.

It is a related object of the present invention to provide a differential gear mechanism which accomplishes both of the above-stated objects, while at the same time being designed to have a slower time of engagement when operating at normal temperatures, thus reducing the likelihood of harsh engagements.

The above and other objects of the invention are accomplished by the provision of a differential gear mechanism of the type including a gear case defining a gear chamber, differential gear means disposed in the gear chamber, the differential gear means including at least one input gear and first and second output gears. A lock-up means is included for locking up the differential gear means to retard differentiating action. The lock-up means includes clutch means operable between an engaged condition, effective to retard relative rotation between the gear case and the output gears, and a disengaged condition. The lock-up means further includes cam means operatively associated with the clutch means, and including first and second cam members, the second cam member being axially movable relative to the first cam member in response to relative rotation therebetween, to effect the engaged condition of the clutch means. The clutch means comprises active clutch means disposed immediately adjacent the second cam member and operable to affect the time of engagement of the clutch means.

The improved differential gear mechanism is characterized by the active clutch means comprising at least a pair of engaging clutch surfaces, with one of the pair of clutch surfaces comprising a pyrolytic carbon friction material and the other of the pair of clutch surfaces comprising a non-pyrolytic carbon friction material. In accordance with another aspect of the present invention the clutch means further comprises inactive clutch means operable to provide a major portion of the torque transmitting capacity of the clutch means. The inactive clutch means comprises a plurality of pairs of engaging clutch surfaces, all of the inactive clutch surfaces comprising non-pyrolytic carbon friction material.

In accordance with a more limited aspect of the present invention, the improved differential gear mechanism is characterized by the non-pyrolytic friction material comprising a stamped, steel clutch disc.

DESCRIPTION OF THE PREFERRED EMBODIMENT

Figure 1:
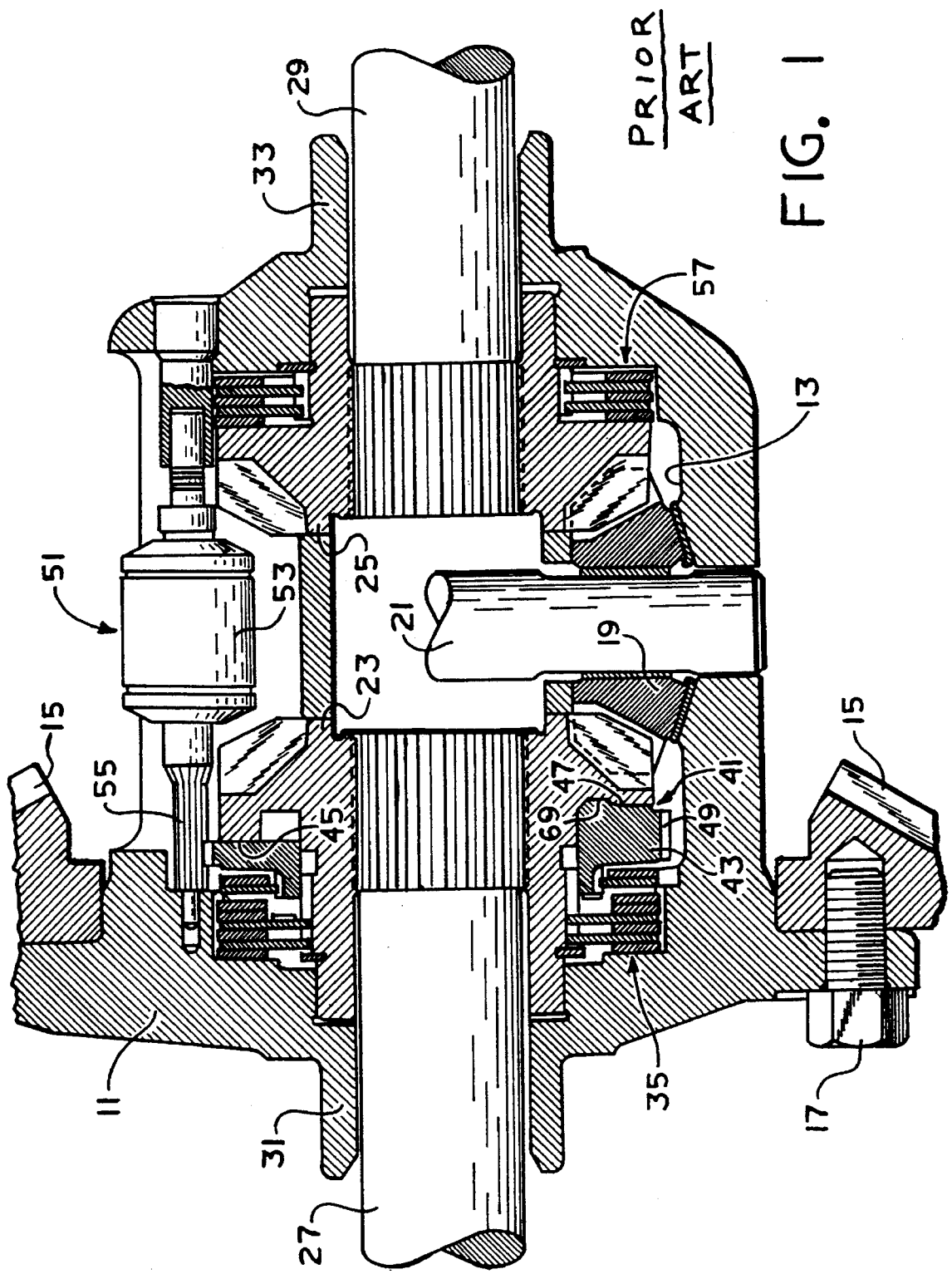
FIG. 1 is an axial cross-section of a locking differential mechanism of the type with which the present invention may be utilized.

Referring now to the drawings, which are not intended to limit the present invention, FIG. 1 is an axial cross-section of a locking differential gear mechanism of the type which may advantageously utilize the present invention. The overall construction and operation of the locking differential shown in FIG. 1 is already well known to those skilled in the art, and is illustrated and described in greater detail in above-incorporated U.S. Pat. No. 4,389,909.

The differential gear mechanism includes a gear case 11 which defines therein a gear chamber, generally designated 13. Torque input to the locking differential is typically by means of an input gear 15 (shown only in fragmentary view in FIG. 1). The input gear 15 (also referred to as a "ring gear") is intended to be in toothed engagement with an input pinion gear (not shown in FIG. 1). The input gear 15 may be attached to the gear case 11 by means of a plurality of bolts 17.

Disposed within the gear chamber 13 is a differential gear set including a plurality of pinions 19 (only one of which is shown in FIG. 1), rotatably mounted on a pinion shaft 21 (only a portion of which is shown in FIG. 1). The pinion shaft 21 is secured to the gear case 11 by any suitable means. The pinions 19 comprise the input gears of the differential gear set, and are in meshing engagement with a pair of side gears 23 and 25, which comprise the output gears of the differential gear set. The side gears 23 and 25 are splined to a pair of axle shafts 27 and 29, respectively. The gear case 11 includes annular hub portions 31 and 33, surrounding the axle shafts 27 and 29, respectively. Typically, bearing sets (not shown) are mounted on the hub portions 31 and 33 to provide rotational support for the differential gear mechanism, relative to the main, outer casing (also not shown in FIG. 1).

During normal, straight-ahead operation of the vehicle, no differentiating action occurs between the left and right axle shafts 27 and 29, and the pinions 19 do not rotate relative to the pinion shaft 21. Therefore, the gear case 11, the pinions 19, the sidegears 23 and 25, and the axle shafts 27 and 29 all rotate about the axis of the axle shafts 27 and 29, as a solid unit.

Under certain operating conditions, such as when the vehicle is turning, or a slight difference in the tire size exists, it is permissible for a certain amount of differentiating action to occur between the sidegears 23 and 25, up to a predetermined level of speed difference. Above that predetermined level (e.g., above a differential of 100 rpm between the sidegears) indicating that a wheel spin-out is imminent, it is desirable to retard the relative rotation between the gear case 11 and the sidegears 23 and 25, to prevent excessive differentiating action.

In order to retard differentiating action, the differential gear mechanism is provided with a lock-up means for locking up the differential gear set, and an actuating means for actuating the lock-up means. The general construction and operation of the lock-up means and the actuating means are now well known in the art, and will be described only briefly herein. For a more detailed explanation of the lock-up means and actuating means, reference should be made to U.S. Pat. Nos. Re. 28,004, and 3,831,462, both of which are assigned to the assignee of the present invention, and both of which are incorporated herein by reference.

Figure 2:
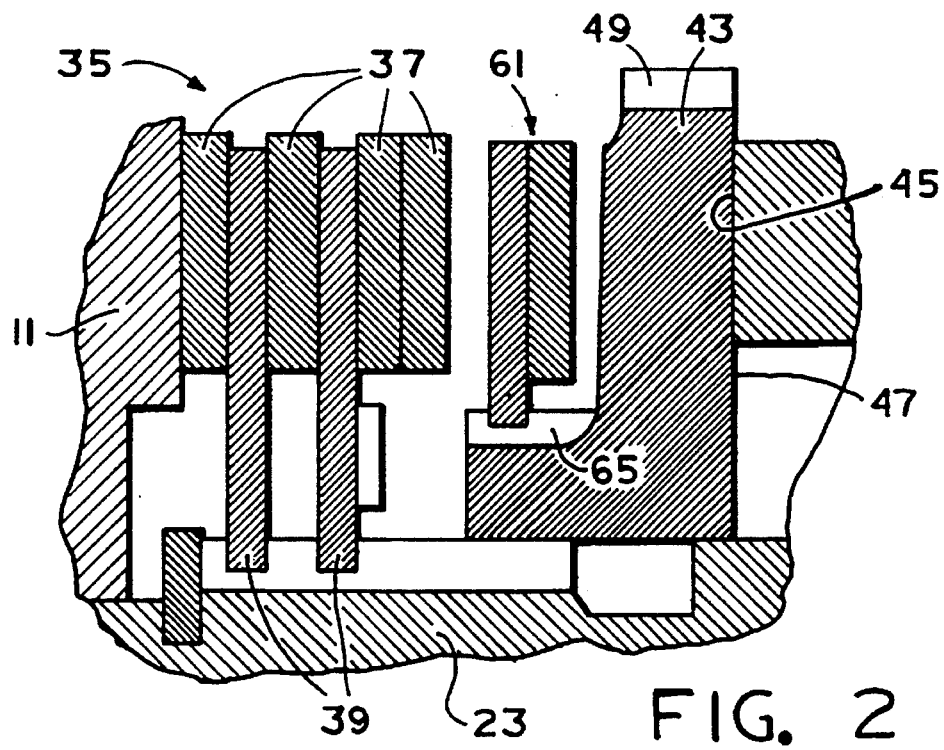
FIG. 2 is an enlarged, fragmentary, axial cross-section, similar to FIG. 1, illustrating the clutch pack to which the present invention relates.

In the subject embodiment, the lock-up means comprises a clutch pack, generally designated 35 in FIG. 1. Referring now to FIG. 2, the clutch pack 35 includes a plurality of clutch discs 37, splined to the gear case 11, and a plurality of clutch discs 39, splined to the sidegear 23. Referring again to FIG. 1, the lock-up means further includes a cam mechanism, generally designated 41. As is well known to those skilled in the locking differential art, the primary function of the cam mechanism 41 is to effect movement of the clutch pack 35 from the disengaged condition shown in FIG. 2 to an engaged condition (not shown herein). In the engaged condition, the clutch pack 35 is effective to retard relative rotation between the gear case 11 and the sidegear 23, thus retarding and minimizing differentiating action between the sidegears 23 and 25.

The cam mechanism 41 includes the side gear 23 and a main cam member 43. The side gear 23 defines a cam surface 45, and the cam member 43 defines a cam surface 47 (see FIGS. 2, 6, and 7). The cam member 43 also defines a set of external teeth 49, the function of which will be described subsequently. During normal, straight-ahead operation of the vehicle, with little or no differentiating action occurring, the cam surfaces 45 and 47 remain in the neutral position shown in FIG. 1, with the cam member 43 rotating with the sidegear 23, at the same rotational speed. Movement of the clutch pack 35 to the engaged condition is accomplished by retarding rotation of the cam member 43, relative to the sidegear 23, which causes "ramping" of the cam surfaces 45 and 47, as is well known to those skilled in the art. This ramping results in axial movement of the cam member 43 to the left in FIG. 1, thus beginning the engagement of the clutch pack 35.

Figure 6:
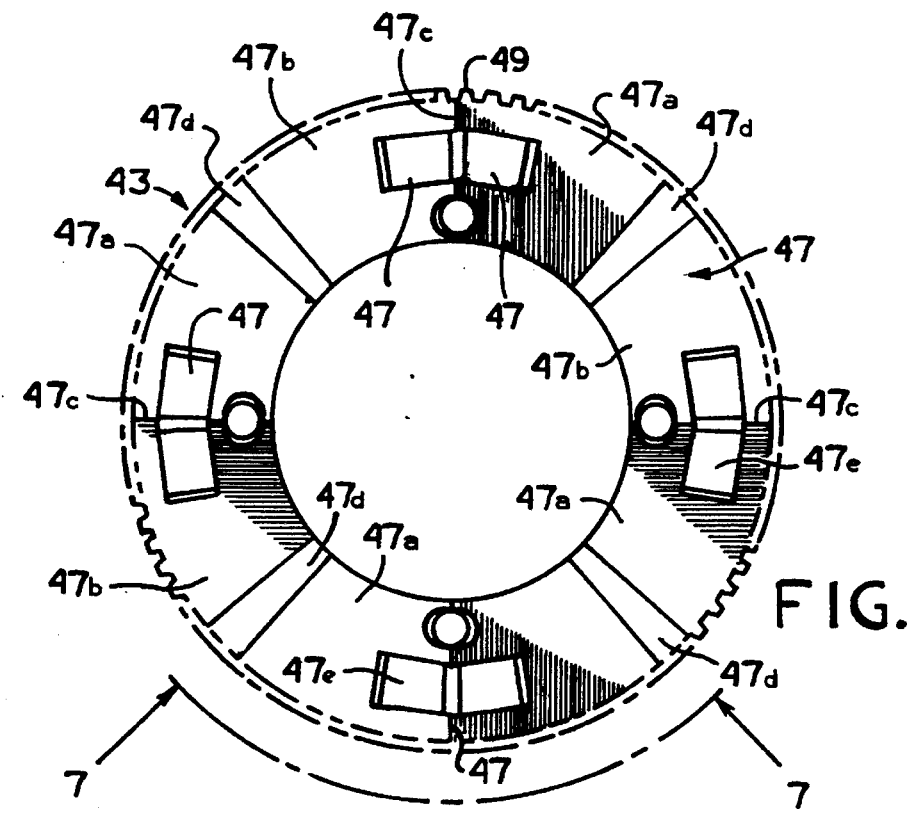
FIG. 6 is a plan view of one of the cam members in use in the locking differential mechanism of the present invention.
Figure 7:
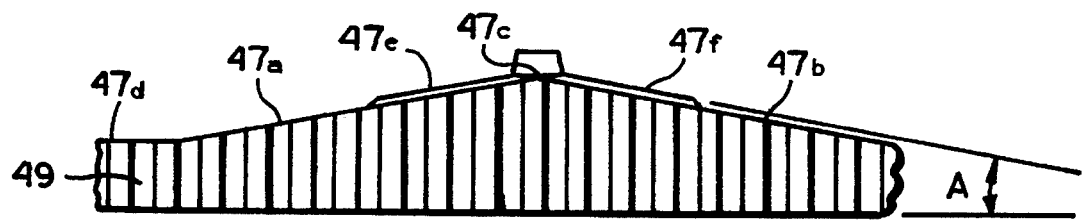
FIG. 7 is a fragmentary side view of the cam member shown in FIG. 6, but on a scale twice that of FIG. 6.

Referring now primarily to FIGS. 6 and 7, the cam surface 47 comprises a plurality of alternating rising surface portions 47a and falling surface portions 47b. It should be clearly understood that the terms "rising" and "falling" are based upon an assumed counter-clockwise direction of travel around the cam member 43. Each of the rising surface portions 47a meets the next (in a counter-clockwise direction) falling surface portion 47b at a peak 47c, while being separated from the preceding falling surface portion 47b by a flat, valley surface 47d. Each of the rising surface portions 47a is provided with a pad portion 47e, while each of the falling surface portions 47b is provided with a pad portion 47f, the pad portions projecting slightly in an axial direction from the adjacent surface portion. The cam and pad arrangement illustrated in FIGS. 6 and 7 and described herein is in commercial use on locking differentials produced by the assignee of the present invention, and is illustrated and described in greater detail in above-incorporated U.S. Pat. No. 4,389,909. As may be seen in FIG. 7, each of the rising surface portions 47e and 47f define a cam angle A relative to a transverse surface.

In order to retard rotation of the cam member 43, relative to the sidegear 23, the mechanism includes a retarding mechanism, generally designated 51, which comprises the actuating means for actuating the lock-up means. It should become apparent to those skilled in the art that within the scope of the present invention, many different configurations and types of retarding mechanisms may be utilized. In the subject embodiment, the retarding mechanism 51 is of the flyweight type, illustrated and described in greater detail in above-incorporated U.S. Pat. No. Re. 28,004. The retarding mechanism 51 is mounted within the gear case 11 for rotation about its own axis, and includes a cylindrical flyweight portion 53. The retarding mechanism 51 further includes an externally-geared portion 55 which is in engagement with the external gear teeth 49 of the cam member 43. During operation, if differentiating action begins to occur between the axle shafts 27 and 29, the sidegear 23 and cam member 43 will begin to rotate in unison at a speed different than that of the gear case 11, causing the retarding mechanism 51 to begin to rotate about its axis at a rotational speed which is a function of the extent of the differentiating action. As the speed of rotation of the mechanism 51 increases, centrifugal force causes the flyweights 53 to move outward until one of the flyweights engages a stop mechanism (not shown herein) preventing further rotation of the mechanism 51. When the retarding mechanism 51 stops rotating, the engagement of the geared portion 55 and the gear teeth 49 causes the cam member 43 to rotate at the same speed as the gear case 11 (which is different than the speed of rotation of the sidegear 23), resulting in ramping, and initializing of engagement of the clutch pack 35.

Active and Inactive Clutch Discs

Referring still to FIG. 1, there is a clutch pack, generally designated 57, including a plurality of clutch discs splined to the gear case 11, and a plurality of clutch discs splined to the sidegear 25. In FIG. 1, the individual clutch discs do not bear reference numerals. The clutch pack 57 will be understood as comprising inactive discs, as that term was defined in the BACKGROUND OF THE DISCLOSURE. In addition, and referring now primarily to FIGS. 2 and 3, all of the clutch discs 37 and 39 also comprise inactive discs. In the subject embodiment, the inactive discs in the clutch pack 57, together with the inactive discs 37 and 39 in the clutch pack 35, transmit a major portion of the total torque which is transmitted from the gear case 11 to the sidegears 23 and 25. As is well known to those skilled in the art, the torque capacity of clutch discs is generally proportional to the area of frictional engagement. In the subject embodiment, there are five inactive discs in the clutch pack 57 and five inactive discs in the clutch pack 35, for a total of ten inactive discs.

Figure 3:
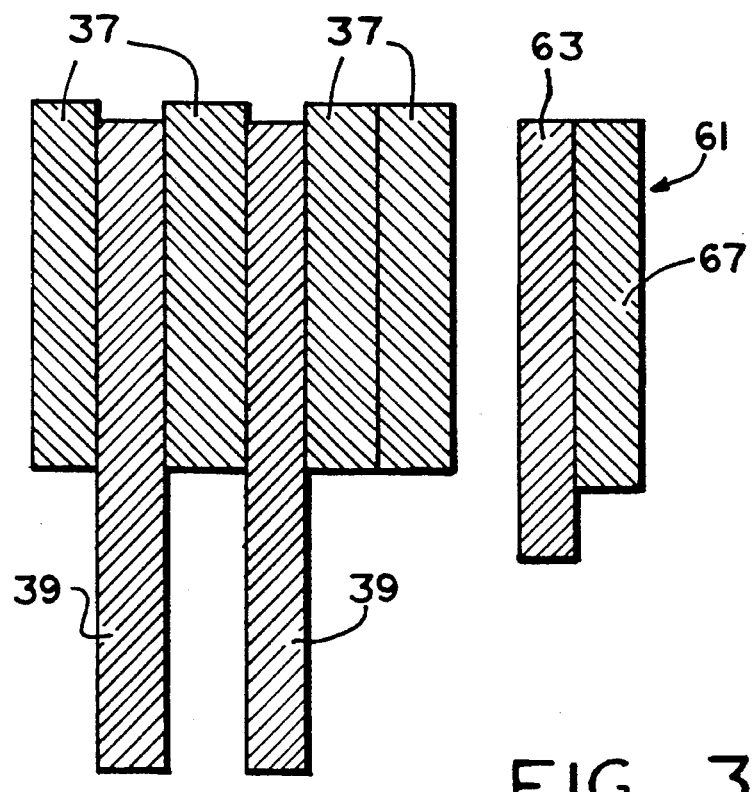
FIG. 3 is a further enlarged, axial cross-section, similar to FIG. 2, but showing only the discs comprising the clutch pack.

Referring now primarily to FIGS. 2 and 3, there is an active disc pack, generally designated 61, operably associated with the cam mechanism 41, and more specifically, operably associated with the main cam member 43. The active disc pack 61 includes a disc 63 which is in splined engagement with a set of external splines 65 defined by the main cam member 43, for rotation therewith. Disposed axially between the disc 63 and the main cam member 43 is a disc 67. Therefore, the discs 63 and 67 (and sometimes, the adjacent disc 37) comprise N active discs wherein, by way of example N=1. The structure which has been illustrated and described up to this point represents the conventional locking differential and active and inactive discs typically utilized therein. As is also typical, all of the discs in the inactive clutch packs 35 and 57, and in the active clutch pack 61 would comprise plain, stamped steel discs, perhaps including some sort of pattern stamped into the disc surface to enhance frictional engagement between adjacent disc surfaces.

Figure 4:
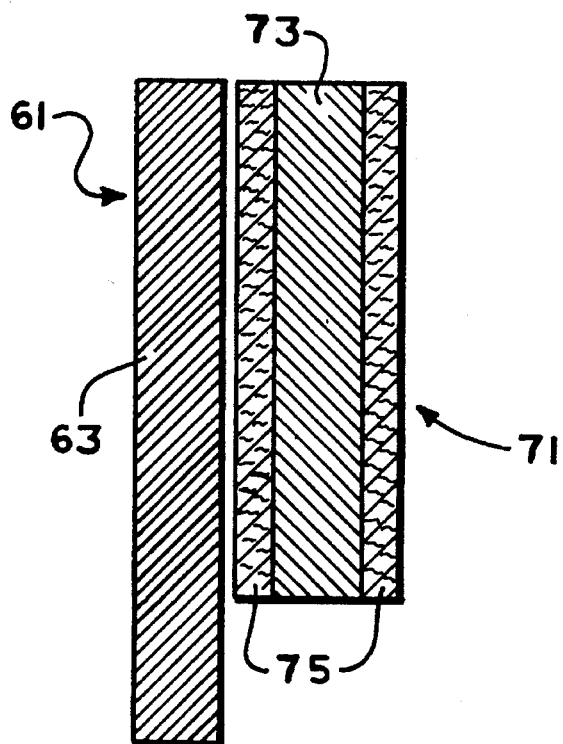
FIG. 4 is a further enlarged, fragmentary, axial cross-section of only a pair of active clutch discs, illustrating the present invention.

Referring now primarily to FIG. 4, a key aspect of the present invention is illustrated. In FIG. 4, the active disc pack 61 comprises the disc 63 which is splined to the cam member 43. However, in FIG. 4, the plain steel disc 67 has been replaced with a disc assembly, generally designated 71. The disc assembly 71 comprises a disc member 73, which may be substantially identical to the disc 67 shown in FIG. 3, except that the disc member 73 would typically not have any sort of pattern stamped into either disc surface (i.e., into either the left surface or the right surface).

Instead, the disc member 73 is provided, on each disc surface thereof, with a layer of pyrolytic carbon friction material 75. By way of general explanation only, and not by way of limitation, "pyrolytic carbon" friction material comprises a substrate formed of carbon fibers having a coating of carbon deposited on the fibers by chemical vapor deposition, such that the resulting friction material has a relatively open mesh so that the surface texture of the substrate is still discernible after the coating of carbon is applied. Such a pyrolytic carbon friction material is described and illustrated in greater detail in U.S. Pat. No. 4,700,823, assigned to the assignee of the present invention and incorporated herein by reference. It should be understood that, as used hereinafter, and in the appended claims, the term "pyrolytic carbon" will mean any friction material of the type illustrated in, described in, or within the scope of the claims of, the above-incorporated U.S. Pat. No. 4,700,823, or which provides the characteristic of the co-efficient of friction not substantially decreasing with increasing temperature. It is preferred, but not essential to the present invention, that the material which comprises "pyrolytic carbon" for purposes of the present invention has a coefficient of friction which actually increases with increasing temperature.

Conversely, as used hereinafter, and in the appended claims, the term "non-pyrolytic carbon", in reference to a friction material, a clutch disc, or a clutch surface, shall mean any such material, disc, or surface which does not comprise "pyrolytic carbon", as defined above. Therefore, in the embodiment of the present invention shown in FIG. 4, the clutch disc 63, which has been described by way of example only as a plain steel disc, would comprise a "non-pyrolytic carbon" disc, or would comprise a disc having "non-pyrolytic carbon" friction surfaces. Of course, in the case of a plain steel disc, the reference to having "non-pyrolytic carbon" friction material in reality denotes the absence of any friction material being added to the plain steel disc, i.e., the plain surface of the disc is the "friction material".

During the course of the development of the locking differential of the present invention, with the active clutch pack being made in accordance with FIG. 4, it was determined that increasing temperature does not result in a decreased time of engagement, and a decreased torque capacity, as was the case with the prior art locking differentials. In addition, with the present invention, it is possible to avoid the decrease in time of engagement with torque capacity, without decreasing the overall torque transmitting capacity of the locking differential. This aspect of the invention will described subsequently.

It is known from above-incorporated U.S. Pat. No. 4,700,823 to use pyrolytic carbon friction material on some substantial number of friction surfaces within the clutch packs of a slip-limiting differential. However, as may be seen in FIG. 4, the addition of pyrolytic carbon friction material to both friction surfaces of the disc member 73 increases the overall axial thickness of the disc assembly 71 by a substantial amount (even though FIG. 4 is not intended to be "to-scale"). Therefore, with the total axial space between the main cam member 43 and the gear case 11 being limited to that illustrated in FIG. 2, adding a layer of pyrolytic carbon friction material to both surfaces of every disc, or even every other disc, would result in not being able to fit the total number of discs desired into the given space. For example, in FIG. 2, there are five inactive discs in the clutch pack 35 and three active discs in the active pack 61 for a total of eight discs. In the subject embodiment, adding pyrolytic carbon to at least every other disc, as was suggested in the above-incorporated U.S. Pat. No. 4,700,823, would result in the "loss" of at least one of the inactive discs 37 or 39. This would result in the loss of two pairs of mating friction surfaces out of the total of four pairs of friction surfaces in the torque-transmitting inactive pack 35, for a loss of about fifty percent of the torque-transmitting capability of the inactive discs in the clutch pack 35.

Figure 5:
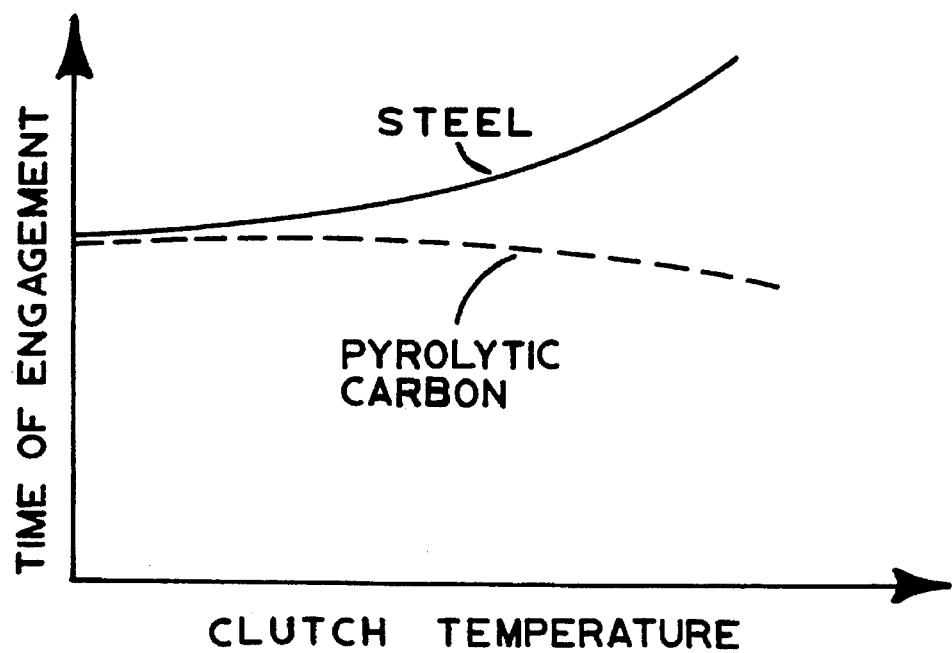
FIG. 5 is a graph of time of engagement versus clutch temperature, comparing the present invention with the prior art.

In operation, after the locking differential of the present invention has cycled through several engagements, thus increasing the temperature of the clutch, the coefficient of friction of the pyrolytic carbon layers 75 actually increases, with increased temperature (see FIG. 5). As the coefficient of friction increases, the time of engagement of the clutch pack 35 actually decreases (i.e., a shorter $\Delta T$ before engagement occurs). As a result of these changes with temperature, the total torque capacity of the differential (i.e., maximum torque before slippage occurs) actually increases with repeated use. Thus, the reference herein to a "variable rate" locking differential, which merely means that with repeated use and increasing temperature, the time of engagement decreases and the total torque capacity increases.

During the development of the present invention, and in accordance with a further aspect of the present invention, it was determined that with the active clutch pack being made in accordance with the invention as shown in FIG. 4, it would be preferable to modify the cam mechanism 41. More specifically, it was observed that, because of the use of the pyrolytic carbon friction material 75, the result is a faster rate of engagement.

Therefore, it has been found preferable to increase the cam angle A to compensate for the increased aggressiveness associated with the use of the pyrolytic carbon friction material in the active discs. More specifically, in the subject embodiment, the cam angle A was increased by approximately one degree for each disc member having pyrolytic carbon on its clutch surfaces. Therefore, as shown in FIG. 4, with only a single disc 73 having pyrolytic carbon, the cam angle A of the cam member 43 was increased from about 12.5 degrees to about 13.5 degrees. As is now well known to those skilled in the art, if the engagement of the clutch pack in a locking differential occurs too quickly, for example, in less than 0.1 seconds, the differential may cycle between the locked and the unlocked conditions. On the other hand, if the engagement of the clutch pack takes more than about one second, the torque transmitted through the relatively moving clutch discs during that time period may be sufficient to burn up the clutch, thus rendering it useless for subsequent engagements. Accordingly, adjusting the cam angle A to compensate for the use of the pyrolytic carbon friction material in the active clutch pack 61 is a significant aspect of the present invention.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A differential gear mechanism of the type including a gear case defining a gear chamber, differential gear means disposed in said gear chamber, said differential gear means including at least one input gear and first and second output gears; lock-up means for locking up said differential gear means to retard differentiating action, said lock-up means including clutch means operable between an engaged condition, effective to retard relative rotation between said gear case and said output gears, and a disengaged condition; said lock-up means further including cam means operatively associated with said clutch means, and including first and second cam members, said second cam member being axially movable relative to said first cam member in response to relative rotation therebetween to effect said engaged condition of said clutch means; said clutch means comprising active clutch means disposed immediately adjacent said second cam member and affecting the time of engagement of said clutch means; characterized by:

(a) said active clutch means comprising at least a pair of engaging clutch surfaces, one of said pair of said clutch surfaces comprising a pyrolytic carbon friction material, and the other of said pair of said clutch surfaces comprising a non-pyrolytic carbon friction material; and (b) said clutch means further comprising inactive clutch means disposed adjacent said active clutch means, and operable to provide a major portion of the torque-transmitting capacity of said clutch means, said inactive clutch means comprising a plurality of pairs of engaging clutch surfaces, all of said clutch surfaces comprising a non-pyrolytic carbon friction material.

2. A differential gear mechanism as claimed in claim 1, characterized by said non-pyrolytic carbon friction material comprises a stamped, steel clutch disc.

3. A differential gear mechanism as claimed in claim 1, characterized by said active clutch means comprises two pairs of engaging clutch surfaces, one of each of said pairs of clutch surfaces comprising a pyrolytic carbon friction material, and the other of each of said pairs of clutch surfaces comprising a non-pyrolytic carbon friction material.

4. A differential gear mechanism as claimed in claim 1, characterized by said active clutch means comprises a plurality N of clutch discs and said inactive clutch means comprises a plurality of at least 2N clutch discs.

5. A differential gear mechanism as claimed in claim 1, characterized by said inactive clutch means comprises a first inactive clutch pack, disposed immediately adjacent said active clutch means, and operably associated with said first output gear, said inactive clutch means further comprising a second inactive clutch pack, operably associated with said second output gear.

6. A differential gear mechanism as claimed in claim 5, characterized by said active clutch means comprises a plurality N of clutch discs and said first and second inactive clutch packs together comprise a plurality of at least 3N clutch discs.

7. A differential gear mechanism of the type including a gear case defining a gear chamber, differential gear means disposed in said gear chamber, said differential gear means including at least one input gear and first and second output gears; lock-up means for locking up said differential gear means to retard differentiating action, said lock-up means comprising clutch means including first clutch means operably associated with said first output gear and second clutch means operably associated with said second output gear, each of said first and second clutch means having an engaged condition and a disengaged condition; said lock-up means further including cam means operatively associated with said first clutch means, and including first and second cam members, said second cam member being axially movable relative to said first cam member in response to relative rotation therebetween to effect said engaged condition of said first clutch means; said first clutch means comprising active clutch means disposed immediately adjacent said second cam member and affecting the time of engagement of said clutch means, and said second clutch means comprising inactive clutch means, operable to provide a major portion of the torque-transmitting capacity of said mechanism; characterized by:

(a) said active clutch means comprising at least a pair of engaging clutch surfaces, one of said pair of said clutch surfaces comprising a pyrolytic carbon friction material and the other of said clutch surfaces comprising a non-pyrolytic carbon friction material; and (b) said inactive clutch means of said second clutch means comprising a plurality of pairs of engaging clutch surfaces, all of said clutch surfaces comprising non-pyrolytic carbon material.

8. A differential gear mechanism as claimed in claim 7, characterized by said first clutch means further comprising a plurality of inactive clutch means, all of said inactive clutch means of said first clutch means comprising non-pyrolytic carbon friction material.

9. A differential gear mechanism as claimed in claim 8, characterized by said active clutch means of said first clutch means comprising a plurality N of clutch discs and said inactive clutch means comprises a plurality of at least 2N clutch discs.

10. A differential gear mechanism of the type including a gear case defining a gear chamber, differential gear means disposed in said gear chamber, said differential gear means including at least one input gear and first and second output gears; lock-up means for locking up said differential gear means to retard differentiating action, said lock-up means including clutch means operable between an engaged condition, effective to retard relative rotation between said gear case and said output gears, and a disengaged condition; said lock-up means further including cam means operatively associated with said clutch means, and including first and second cam members, said second cam member being axially movable relative to said first cam member in response to relative rotation therebetween to effect said engaged condition of said clutch means, said first and second cam members defining a nominal cam angle; said clutch means comprising active clutch means disposed immediately adjacent said second cam member and affecting the time of engagement of said clutch means; characterized by:

(a) said active clutch means comprising at least a pair of engaging clutch surfaces, one of said pair of said clutch surfaces comprising a pyrolytic carbon friction material, and the other of said pair of said clutch surfaces comprising a non-pyrolytic carbon friction material;

(b) said clutch means further comprising inactive clutch means disposed adjacent said active clutch means and operable to provide a major portion of the torque-transmitting capacity of said clutch means, said inactive clutch means comprising a plurality of pairs of engaging clutch surfaces, all of said clutch surfaces comprising a non-pyrolytic carbon friction material; and (c) said first and second cam members defining a modified cam angle (A), greater than said nominal cam angle.

\* \* \* \* \*